(12) United States Patent
Zdepski

(10) Patent No.: US 6,915,332 B1
(45) Date of Patent: Jul. 5, 2005

(54) SYSTEM AND METHOD FOR ONE TOUCH E-MAIL REPLY

(75) Inventor: Joel Zdepski, Mountain View, CA (US)

(73) Assignee: OpenTV, Inc., San Francisco, CA (US)

( * ) Notice: Subject to any disclaimer, the term of this patent is extended or adjusted under 35 U.S.C. 154(b) by 0 days.

(21) Appl. No.: 09/288,475

(22) Filed: Apr. 8, 1999

Related U.S. Application Data

(60) Provisional application No. 60/081,095, filed on Apr. 8, 1998, and provisional application No. 60/081,046, filed on Apr. 8, 1998.

(51) Int. Cl.[7] .............................................. G06F 15/16
(52) U.S. Cl. ....................... 709/206; 709/207; 345/752; 345/810
(58) Field of Search ................................. 709/203–207; 345/739, 752, 764, 810, 758, 845; 725/37–43, 131–132; 705/14, 26, 27

(56) References Cited

U.S. PATENT DOCUMENTS

| | | | |
|---|---|---|---|
| 5,283,856 A | | 2/1994 | Gross et al. ................... 706/47 |
| 5,333,266 A | | 7/1994 | Boaz et al. .................. 709/206 |
| 5,414,773 A | | 5/1995 | Handelman .................. 725/117 |
| 5,461,667 A | * | 10/1995 | Remillard .................... 348/468 |
| 5,487,100 A | | 1/1996 | Kane ........................... 340/7.23 |
| 5,504,519 A | | 4/1996 | Remillard ...................... 725/10 |
| 5,522,089 A | * | 5/1996 | Kikinis et al. ............... 345/173 |
| 5,557,320 A | * | 9/1996 | Krebs ........................... 725/114 |
| 5,561,708 A | | 10/1996 | Remillard ................ 379/93.19 |
| 5,561,709 A | | 10/1996 | Remillard .................... 379/96 |
| 5,632,018 A | | 5/1997 | Otorii |
| 5,671,354 A | | 9/1997 | Ito et al. ...................... 713/201 |
| 5,694,616 A | | 12/1997 | Johnson et al. ............. 709/207 |
| 5,706,211 A | | 1/1998 | Beletic et al. |
| 5,734,413 A | * | 3/1998 | Lappington et al. ......... 725/141 |
| 5,734,901 A | | 3/1998 | Sidhu et al. ................. 712/220 |
| 5,778,054 A | * | 7/1998 | Kimura et al. ............... 379/354 |
| 5,793,365 A | * | 8/1998 | Tang et al. ................... 345/758 |
| 5,831,664 A | * | 11/1998 | Wharton et al. ............. 345/156 |
| 5,859,636 A | * | 1/1999 | Pandit ........................ 715/501.1 |
| 5,864,823 A | * | 1/1999 | Levitan |
| 5,907,322 A | * | 5/1999 | Kelly et al. .................. 348/734 |
| 5,931,905 A | * | 8/1999 | Hashimoto et al. ......... 345/719 |
| 6,014,689 A | * | 1/2000 | Budge et al. ................ 345/723 |
| 6,021,427 A | * | 2/2000 | Spagna et al. .............. 709/206 |
| 6,163,345 A | * | 12/2000 | Noguchi et al. ............. 348/564 |
| 6,169,543 B1 | * | 1/2001 | Wehmeyer ................... 345/721 |
| 6,177,931 B1 | * | 1/2001 | Alexander et al. .......... 345/721 |
| 6,209,025 B1 | * | 3/2001 | Bellamy ...................... 709/217 |

(Continued)

FOREIGN PATENT DOCUMENTS

| | | |
|---|---|---|
| JP | 09237234 | 9/1997 |
| WO | WO 97/12486 | 4/1997 |
| WO | WO 97/29591 | 8/1997 |

*Primary Examiner*—William C. Vaughn, Jr.
(74) *Attorney, Agent, or Firm*—Blakely, Sokoloff, Taylor & Zafman LLP

(57) ABSTRACT

The present invention relates to a simplified electronic message response, such as an electronic mail (e-mail) response. According to an embodiment of the present invention, a sender may send an electronic message, such as an e-mail, that includes a main message and one or more options. The receiver may select any of the options, for example, by pressing a number on a remote control that corresponds to an option. Once an option has been selected, information related to the selected option, such as text explaining the selected option to the user, may be presented. The user can then indicate a desire to transmit the selected option. A reply e-mail is automatically generated and sent to the original sender, such as the advertiser.

12 Claims, 12 Drawing Sheets

U.S. PATENT DOCUMENTS

| | | | |
|---|---|---|---|
| 6,223,213 B1 * | 4/2001 | Cleron et al. | 709/206 |
| 6,252,588 B1 * | 6/2001 | Dawson | 345/752 |
| 6,260,192 B1 * | 7/2001 | Rosin et al. | 725/109 |
| 6,308,202 B1 * | 10/2001 | Cohn et al. | 705/27 |
| 6,317,885 B1 * | 11/2001 | Fries | 725/109 |
| 6,388,714 B1 * | 5/2002 | Schein et al. | 348/553 |
| 6,392,664 B1 * | 5/2002 | White et al. | 345/717 |
| 6,493,007 B1 * | 12/2002 | Pang | 345/835 |
| 6,526,577 B1 * | 2/2003 | Knudson et al. | 725/40 |
| 2003/0005445 A1 * | 1/2003 | Schein et al. | 725/51 |

* cited by examiner

Text [Main E-mail message]

1. Short option 1
2. Short option 2
3. Short option 3

Reply to: Orders@bookclub.com
From: Customer
Re: Gone With the Wind (Option #3)

This memorable book by . . .
(Text describing Gone With
the Wind)

Press another number for a corresponding
option OR
Press "0" to send this order

Figure 8B

SYSTEM AND METHOD FOR ONE TOUCH E-MAIL REPLY

RELATED APPLICATIONS

This application claims priority to U.S. Provisional Patent Application Ser. No. 60/081,095, filed Apr. 8, 1998, entitled, "*System and Method for Sending and Receiving E-mail Via a Television*", and U.S. Provisional Patent Application No. 60/081,046, filed Apr. 8, 1998, entitled, "*System and Method for One-Touch E-Mail Reply*", both of which are herein incorporated by reference.

FIELD OF THE INVENTION

This invention is related to electronic messages. In particular, the invention is related to sending and receiving electronic messages in a system with limited input capabilities, such as an interactive television system.

BACKGROUND OF THE INVENTION

A frequent goal of the commercial use of the Internet is to generate revenues for the companies utilizing the Internet. The complexity of this problem may be compounded by a user interface system that limits user input. For example, a user utilizing e-mail access via an interactive television system may be limited to a remote control as the primary user input device. Without a keyboard, user input may be limited to the numerical and directional keys typically provided on the television remote control.

An advertisement on the Internet is often passive, only conveying information to direct the reader to take action to order the advertised products. However, the effectiveness of these advertisements would likely be improved if the reader could simply and easily order a product at the time the reader surveys the advertisement.

It would be desirable to have a system and method for sending and replying to electronic messages, such as advertisements, so that a simple input from the reader would indicate a selection, such as a purchase of a selected product. The present invention addresses such a need.

SUMMARY OF THE INVENTION

The present invention relates to a simplified electronic message response, such as an electronic mail (e-mail) response. According to an embodiment of the present invention, a sender may send an electronic message, such as an e-mail, that includes a main message and one or more options. The electronic message is received by a user. The main message with the one or more options is presented to the user. The user may select any of the options, for example, by pressing a number on a remote control that corresponds to an option. Once an option has been selected, information related to the selected option, such as text explaining the selected option to the user, may be presented. According to an embodiment of the present invention, this text is preferably unalterable by the user. The user can then indicate a desire to transmit the selected option. A reply e-mail is automatically generated and sent to the original sender, such as the advertiser. If the displayed option is not selected, than the original receiver may select another option by pressing a number corresponding to one of the options. If the displayed option is selected, then the reply e-mail is sent back to the original sender. According to an embodiment of the present invention, identification of the selected option may be included in the header so that the original sender does not need to open the reply message in order to determine which option was selected.

A method according to an embodiment of the present invention for responding to an electronic message is presented. The method comprises presenting a main message with at least one option; determining whether the at least one option was selected; presenting information related to the selected option; and determining whether the selected option is to be transmitted.

A method according to an embodiment of the present invention for sending an electronic message is also presented. The method comprises providing a main message; providing at least one option; providing information related to the at least one option, wherein the information is to be presented after the at least one option has been presented and after the at least one option has been selected; and transmitting the electronic message.

A system according to an embodiment of the present invention for responding to an electronic message is also presented. The system comprises a processor configured to present a main message with at least one option; determine whether the at least one option was selected; present information related to the selected option; and determine whether the selected option is to be transmitted. The system also includes a memory coupled with the processor, wherein the memory is configured to provide instructions to the processor.

A system according to an embodiment of the present invention for sending an electronic message is also presented. The system comprises a processor configured to provide a main message; provide at least one option; provide information related to the at least one option, wherein the information is to be presented after the at least one option has been presented and after the at least one option has been selected; and transmit the electronic message. The system also includes a memory coupled with the processor, the memory being configured to provide the processor with instructions.

BRIEF DESCRIPTION OF THE DRAWINGS

FIG. 8 is an example of a series of short options which may be displayed to a reader according to an embodiment of the present invention.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
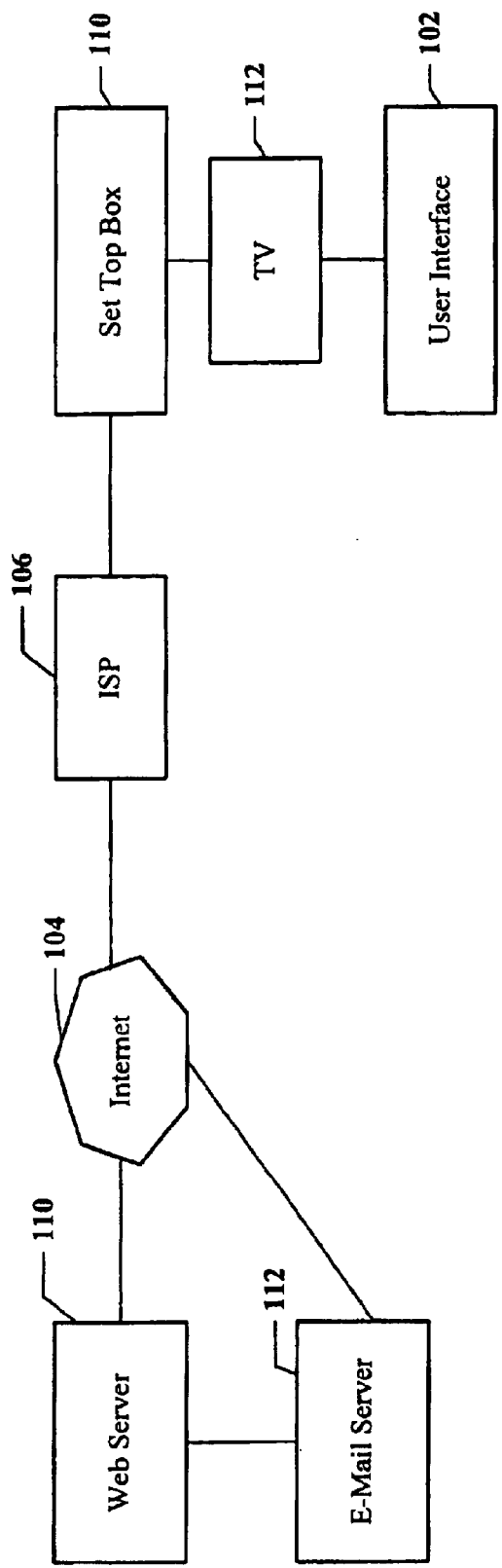
FIGS. 1A–1B illustrate examples of systems suitable for implementing an embodiment of the present invention.
Figure 1B:
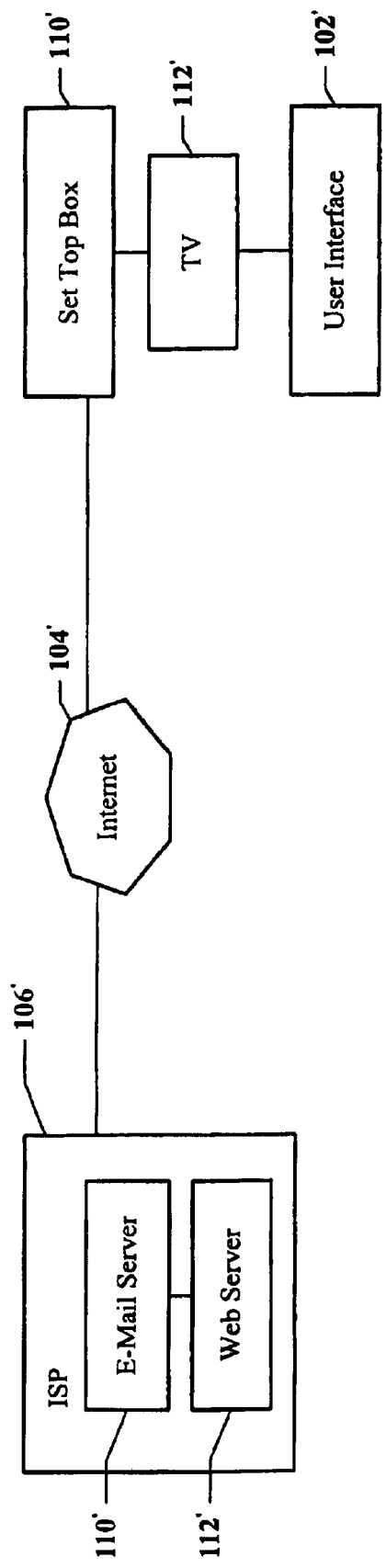

FIGS. 1A–1B show examples of an E-mail system suitable for implementing an embodiment of the present invention. FIG. 1A shows an example of a limited resource E-mail system, such as an interactive television system. The interactive television system is shown to include a television 112 coupled with a user interface 102 and a set top box 110. Examples of the user interface 102 include a remote control, a keyboard, or a mouse. The set top box 110 may be any standard set top box, such as the set top box manufactured by Echostar. The set top box 110 is shown to be coupled with an Internet service provider 106. Examples of an Internet service provider include Netcom, and America On Line. The Internet service provider (ISP) 106 is also shown to be coupled with the Internet 104. A proxy server 110 and an E-mail server 112 are coupled with each other as well as with the Internet 104. According to an embodiment of the present invention, E-mail may be sent and received by the set top box 110 through the ISP 106, the Internet 104, and the proxy server 110. The proxy server 110 may be an ISP 106 proxy server coupled to the E-mail server 112. Alternatively, the proxy server 110 may be a non-ISP 106 proxy server. For example, the proxy server 110 may be a corporation's proxy server that is connected to the corporation's E-mail server 112. In either case, the proxy server 110 may access the E-mail server 112 to retrieve or send E-mails.

The system illustrated in Figure IB is similar to that shown in FIG. 1A except that the set top box 110' is coupled to the ISP 106' through the Internet 104'. Additionally, the ISP 106' includes a proxy server 110' and an E-mail server 112' coupled together.

Figure 2:
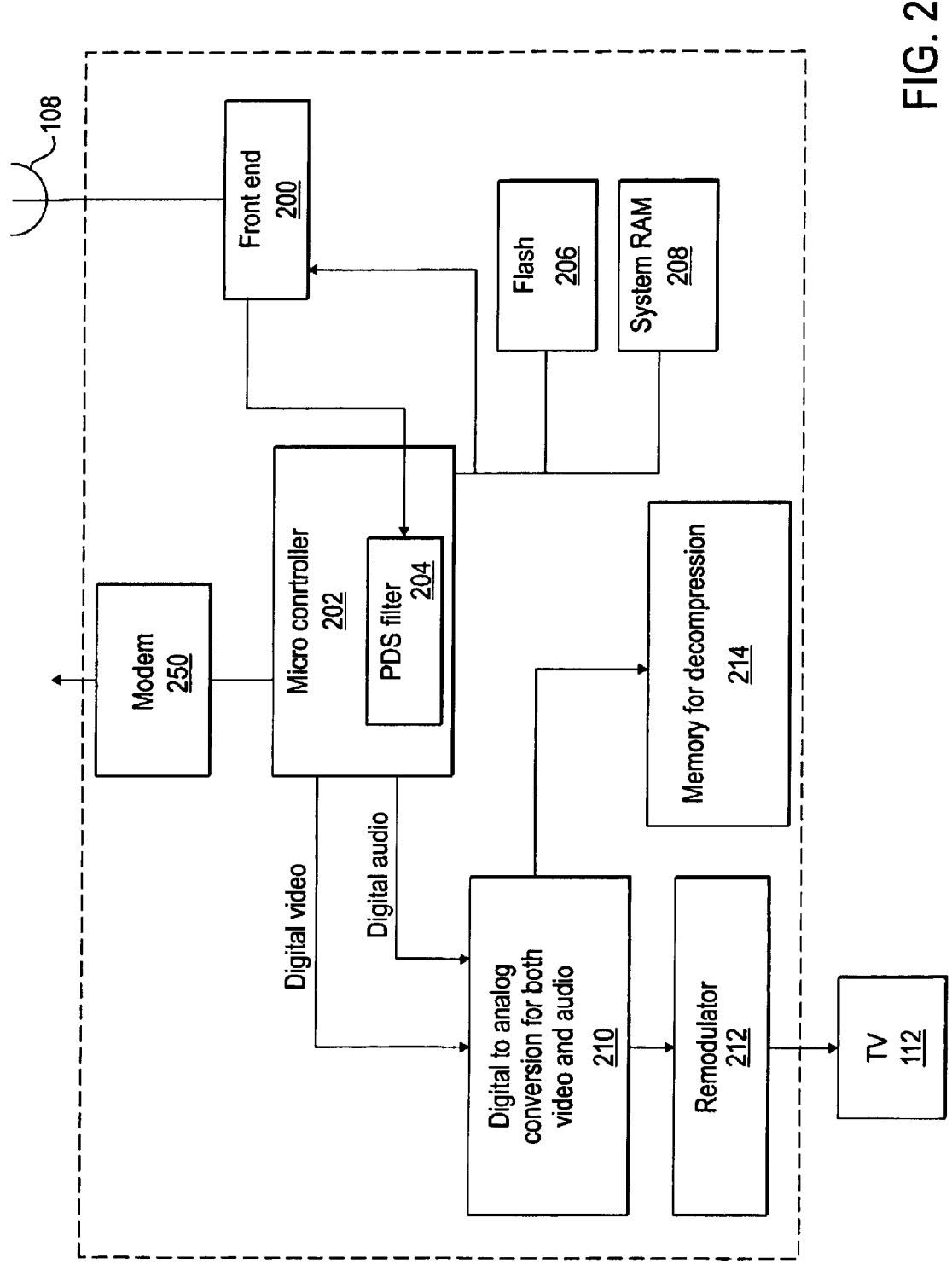
FIG. 2 is a block diagram of an interactive television system suitable for implementing an embodiment of the present invention.

FIG. 2 is a block diagram of an example of a set top box, such as set top box 110 and 110' shown in FIGS. 1A–1B, suitable for implementing an embodiment of the present invention. The set top box 110 shown in FIG. 2 is shown to be coupled with a receiving antenna 108 and a television 112. A signal received by the receiving antenna 108 is sent to a front end 200 which converts analog signals received from the receiving antenna 108 to a digital signal. The signals are then sent from the front end 200 to a microcontroller 202. The microcontroller 202 may also be referred to as a processor. The micro-controller may include a hardware filter, such as a private data stream (PDS) filter 204. The PDS filter 204 may select packets out of the packet stream of the received signal. Digital video signals and digital audio signals are then sent to a digital-to-analog converter 210. There may be a digital-to-analog a conversion for video as well as for audio.

The micro-controller 202 is also shown to be coupled with a FLASH memory 206 and a system random access memory (RAM) 208. Programs which are run by the micro-controller 202 may be located in the FLASH memory 206 or RAM 208, while other information, such as a database, may be located in the system RAM 208. The micro-controller 202 is also optionally coupled with a modem 250 to provide access to networks such as cable or telephone.

The digital-to-analog converter 210 is also shown to be coupled with a memory for decompression 214 which may be utilized in decompressing compressed signals. The digital-to-analog converter 210 is also shown to be coupled with a remodulator 212 which can remodulate audio and video signals for proper format to be displayed on the television 112.

Figure 3A:
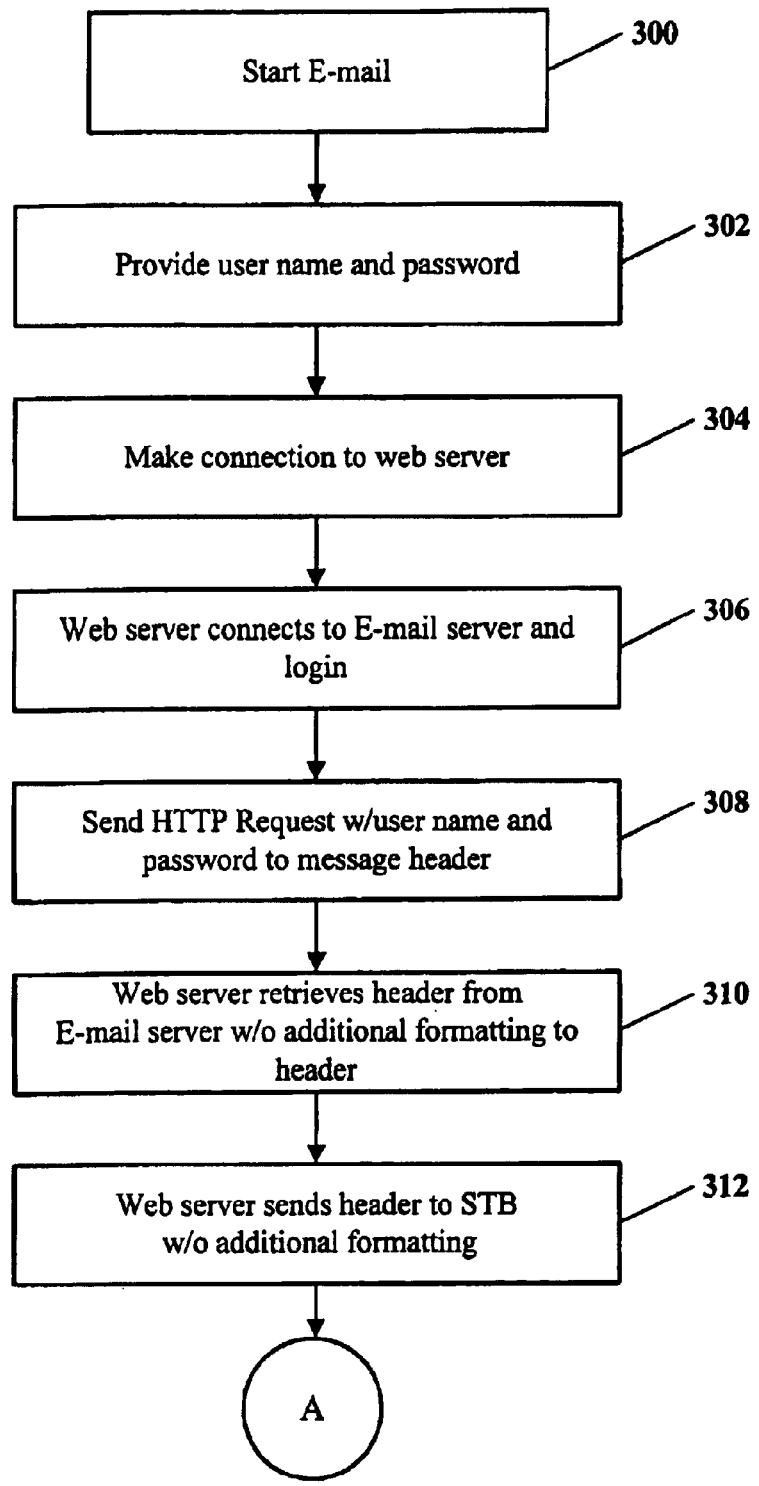
FIGS. 3A–3B are flow diagrams of a method according to an embodiment of the present invention for providing E-mail functionality.
Figure 3B:
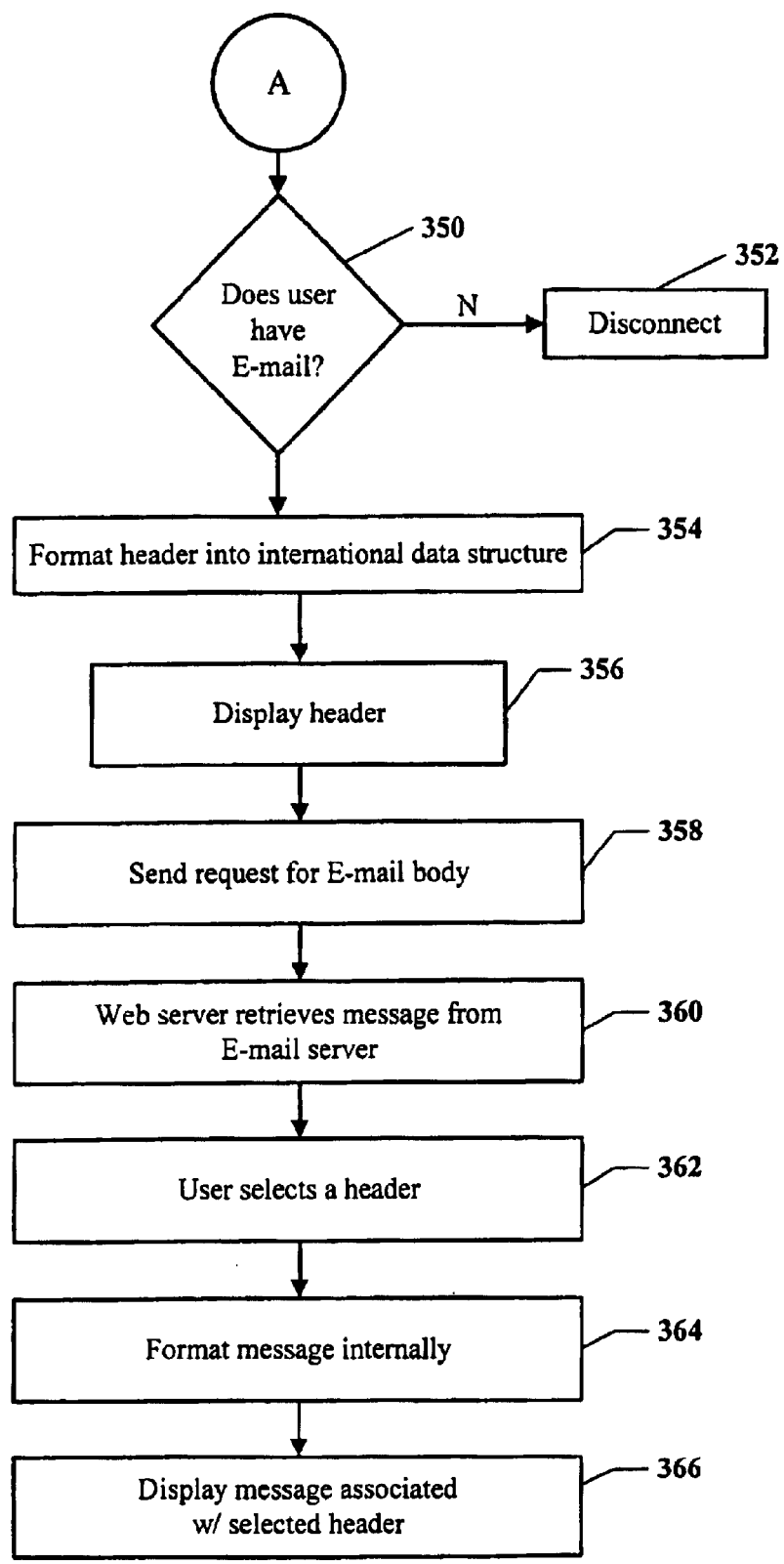

FIGS. 3A–3B are flow diagrams of a method according to an embodiment of the present invention for providing an E-mail function. The E-mail function is started in the resource-limited system, such as the set top box (step 300), and a user name and password is provided (step 302). A connection to a proxy server, such as proxy server 110 or 110' of FIGS. 1A–1B, is then made (step 304). The proxy server then connects to an E-mail server, such as the E-mail server 112 and 112' of FIGS. 1A–1B, and logs in (step 306).

A request for a message header is sent from the proxy server to the E-mail server with a user name and password (step 308). For example, the request may be in HTTP format. An E-mail message typically includes a header and a body. The header may include information such as subject, date, from, to, blind copy (bc), and carbon copy (cc). The body of the E-mail message typically contains the actual text of the message. Assuming there is a message waiting for that particular user, the proxy server then retrieves a message header from the E-mail server without any additional formatting to the header (step 31 0). Accordingly, the proxy server retrieves the header from the E-mail server in text string format.

The proxy server sends the header to the set top box without additional formatting (step 312). Accordingly, the set top box receives the header in the same text string format that was stored in the E-mail server. Thereafter it is determined whether the user has E-mail (step 350). If the user has no E-mail, then the proxy server would not be able to retrieve headers from the Email server, thus the proxy server would not transfer the headers to the user. If the user does not LM have any E-mail, then the E-mail system would disconnect (step 352). If, however, the user does have E-mail, then the received header is formatted into an internal data structure (step 354). Further details of formatting the header will later be discussed in conjunction with FIG. 4. The E-mail header is then displayed on a display, such as a television (step 356).

A request for the E-mail body is then sent to the proxy server (step 358). The proxy server then retrieves the E-mail message from the E-mail server (step 560). In the meantime, the user selects a header (step 362). Assuming that the E-mail body has been received from the proxy server, the selected E-mail message is then internally formatted (step 364). Further details of the internal formatting of the message will later be discussed in conjunction with FIG. 5.

The internal formatting of the E-mail message is generally for the purpose of displaying it on the display screen or television screen. The purpose of formatting the header is also to format it on display on the display. Once the E-mail message is internally formatted, the E-mail message may be displayed associated with a selected header (step 366).

Figure 4:
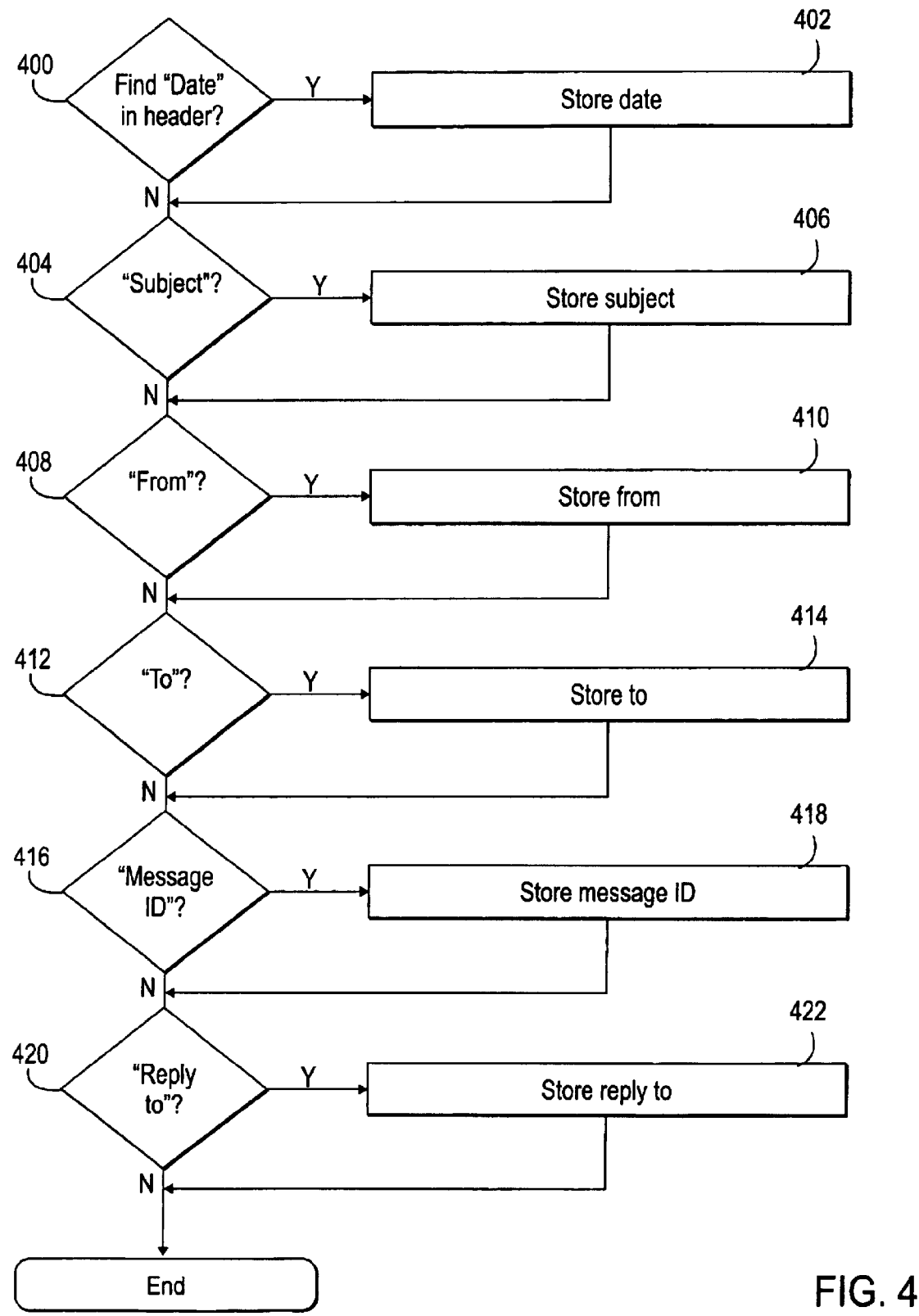
FIG. 4 is a flow diagram of a method according to an embodiment of the present invention for formatting a header.

FIG. 4 is a flow diagram of a method according to an embodiment of the present invention for formatting an E-mail header, such as the formatting recited in step 354 of FIG. 3B. The primary purpose of formatting the E-mail header is to format the header for display. As previously mentioned, the E-mail header may include information such as subject, date, from, to, etc. This information may be organized in an unknown order such that some formatting of the header information may be required. The flow diagram in FIG. 4 shows an example of such internal formatting. For example, it is determined whether the text string "date" is found in the header (step 400). If "date" is found in the header, the date is stored, for example, for the set top box (step 402). It may then be determined whether various other information is found in the header, for example, it is determined whether the subject is found in the header (step 404). If so, then the subject is stored (step 406). Likewise, it may be determined whether the text string "from" is found in the header (step 408), and if so, store the "from" information (step 410). It may also be determined whether the text string "to", "message ID", and "reply to" are found in the header (steps 412, 416, 420), and if so, they are stored (steps 414, 418, and 422). Although the example shown in FIG. 4 is ordered in a particular manner, the header may be formatted in any particular predetermined order for display.

Figure 5:
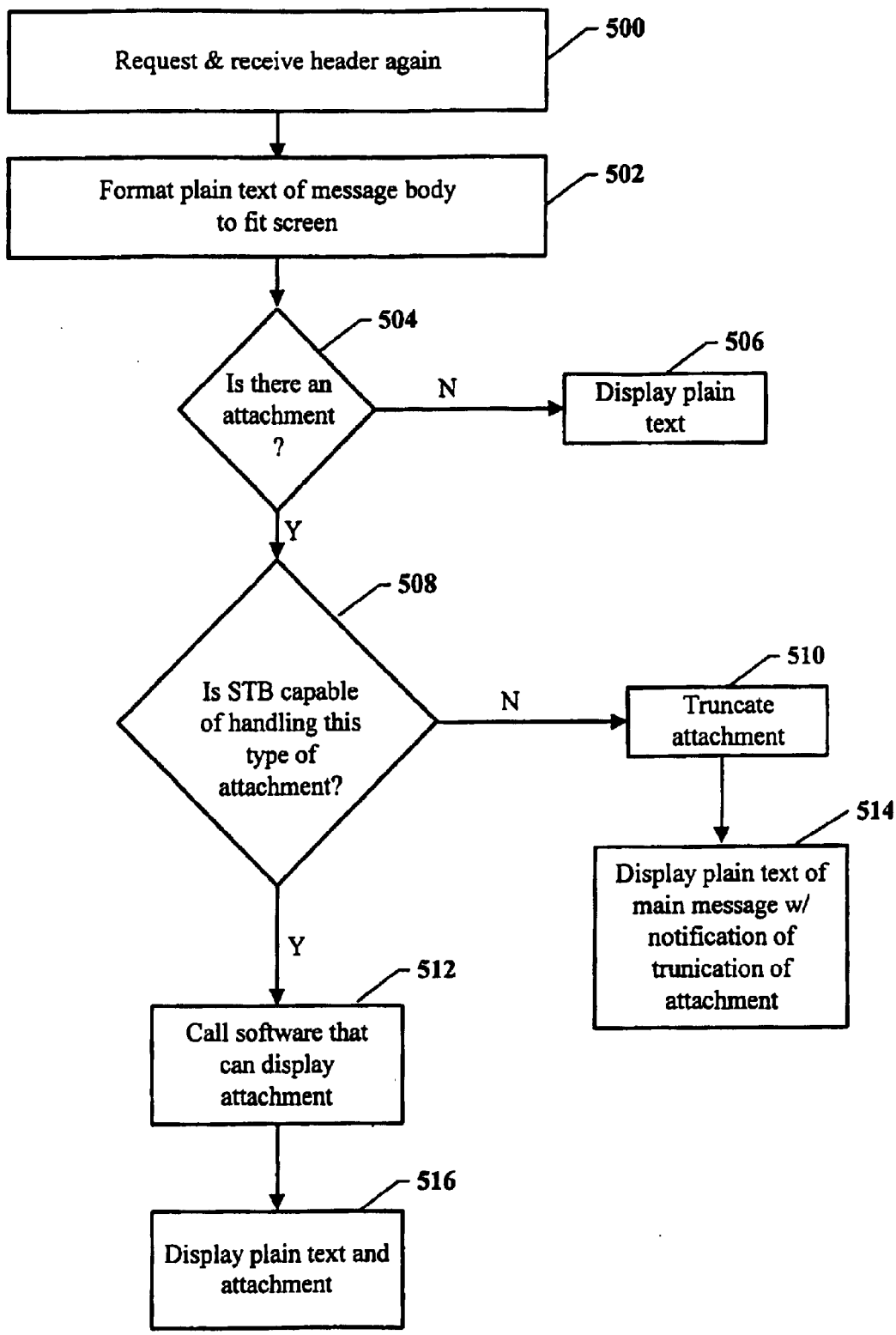
FIG. 5 is a flow diagram of a method according to an embodiment of the present invention for formatting a message prior to display.

FIG. 5 is a flow diagram of a method according to an embodiment of the present invention for formatting an E-mail message prior to displaying the message, such as in step 364 of FIG. 3B. The message header may be requested and received again (step 500). The plain text of the message body is then formatted to fit the screen (step 502). This formatting allows the text to be displayed without the need to scroll side to side. It is then determined whether there is an attachment to the message (step 504). If there is no attachment to the message, then the plain text of the message is displayed (step 506). If, however, there is an attachment to the E-mail message, then it is determined whether the set top box is capable of handling this type of an attachment (step 508). For example, if a Microsoft word document is received as an attachment to the E-mail message, but if the set top box of the interactive television system does not provide Microsoft word functionality, then the set top box would not be capable of handling this type of attachment. If the set top box is incapable of handling this type of attachment, then the attachment is truncated (step 510). The plain text of the main message is then displayed with a notification of the truncation of the attachment (step 514).

If the set top box is capable of handling this type of attachment (step 508), then the software that can display such an attachment is called (step 512). For example, an attachment may need a word processing program or a database management program to be viewed. Thereafter, the plain text of the E-mail message and the attachment is displayed (step 516).

Figure 6:
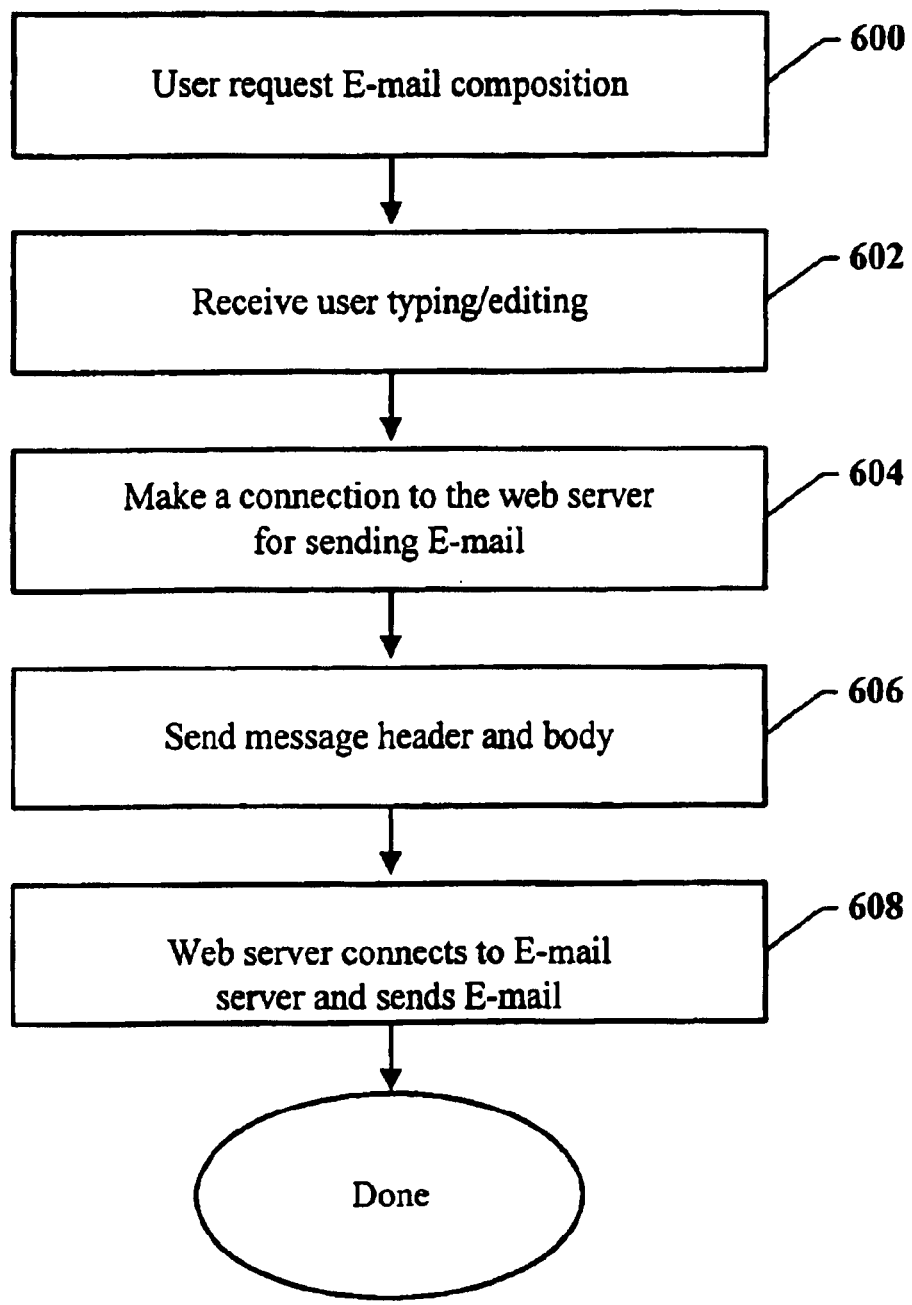
FIG. 6 is a flow diagram of a method according to an embodiment of the present invention for sending E-mail.

FIG. 6 is a flow diagram of the method according to an embodiment of the present invention for sending an E-mail. A user requests an E-mail composition (step 600). The user's typing/editing then received (step 602). A connection is made to the proxy server for sending E-mail (step 604). The message header and body of the E-mail message is then sent to the proxy server (step 606). The proxy server then connects to the E-mail server and sends the E-mail (step 608).

Figure 7:
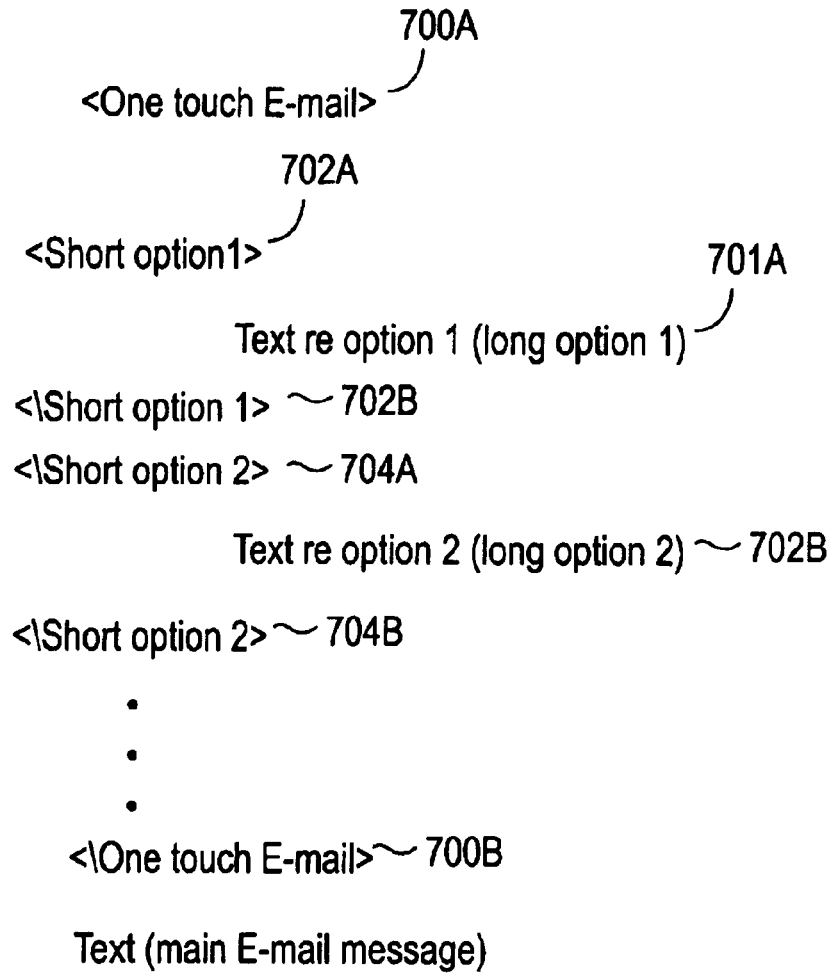
FIG. 7 is an illustration of an example of a format of an e-mail message designed for an e-mail reply according to an embodiment of the present invention.

FIG. 7 is an illustration of an e-mail according to an embodiment of the present invention. The example shown in FIG. 7 is the formatting of an e-mail to be sent to a user. This e-mail may accept a simple input by the user that triggers an automatic generation of a response message to the sender. In this example, the original message includes an indicator 700A, such as <One Touch E-mail>, that indicates that information following the indicator 700A are expected to include at least one option. There may be multiple sections within the text describing a given option. For example, one section may explain the option, while another section may include text prepared in advance to be incorporated into a reply message that may be sent back to the sender.

For example, a first short option indicator 702A may be used to identify the first option in a brief manner. After the first short option indicator 702A, text describing the first option may be inserted. The text describing the first option is herein referred to as the first long option 701A. An end first option indicator 702B may be used to indicate the end of text related to the first option. Thereafter, a second short option indicator 704A may be used to identify the second option. The text following this indicator 704A may be a more detailed description related to the second option. The text describing the second option is herein referred to as the second long option 701B. After the second long option 701B, an end second option indicator 704B may be inserted to indicate the end of the text related to the second option. Additional options may be defined, as desired. Once all of the options have been created, an end option indicator 700B may be used to indicate the end of all of the options.

The indicators 700A–704A, and 700B–704B, may be any demarcation, such as text or symbol, that the programmer may choose to use as an indicator. For example, a phrase, such as "<one touch e-mail>" may be used as a beginning indicator 700A, while a "/" in front of the same phrase, such as "</ one touch e-mail>", may be used for an end indicator 700B, 702B and 704B. One example of creating the indicators 700A–704A and 700B–704B is by using extended markup language (XML).

In the example shown in FIG. 7, the text of the e-mail message is shown to be inserted after the set of options. However, the text of the main e-mail message may also be positioned prior to the set of options.

FIGS. 8A–8B illustrate an example of an e-mail message according to an embodiment of the present invention. An e-mail message created in the format exemplified in FIG. 7 can be displayed to a receiver of the e-mail message, herein referred to as a user, as shown in FIG. 8A. The main text of the e-mail message can be displayed along with the set of short options. For example, the text may be an advertisement for ten special edition books which may be purchased by the reader, while the set of options may be the titles of ten different special edition books that may be purchased by the reader.

The user may select a short option by pressing a key, or navigating a menu, corresponding to the short option. For example, the short options may have a corresponding number, for example, one through ten. The e-mail receiver may press a corresponding number on a user input device, such as a television remote control device, that corresponds to a number associated with a selected short option. When a short option is selected, the e-mail receiver may view another screen, such as that shown in FIG. 8B. For example, if the initial message is an advertisement for special edition books, and the e-mail receiver selects short option number three which may be a title to an offered book, such as "Gone With The Wind", then the e-mail receiver may see further text describing the selected option, such as a book jacket description of "Gone With The Wind". This longer description of the option may be presented to the e-mail receiver in a reply e-mail message addressed to the advertiser, for example the book club company which initially sent the advertising e-mail. The header in such a reply e-mail may indicate which option has been selected so that the sender of the advertisement may note the selected purchase order without opening the returned e-mail. For example, in the "RE" section of a header, the option title, such as "Gone With The Wind", or the option number, maybe indicated.

Alternatively, rather than or in addition to the longer description, pieces of code may also be sent to the receiver so that the receiving machine may run the code. For example, when a short option is selected, animation, such as a dancing baby, may be presented as, or as part of, the longer description.

In addition to the text describing the selected option, further instructions to the e-mail receiver may also be displayed. For example, an instruction to press another number for a corresponding option may be displayed, or an instruction such as "press send to send this order" or "press zero to send this order", may also be displayed.

Figure 9A:
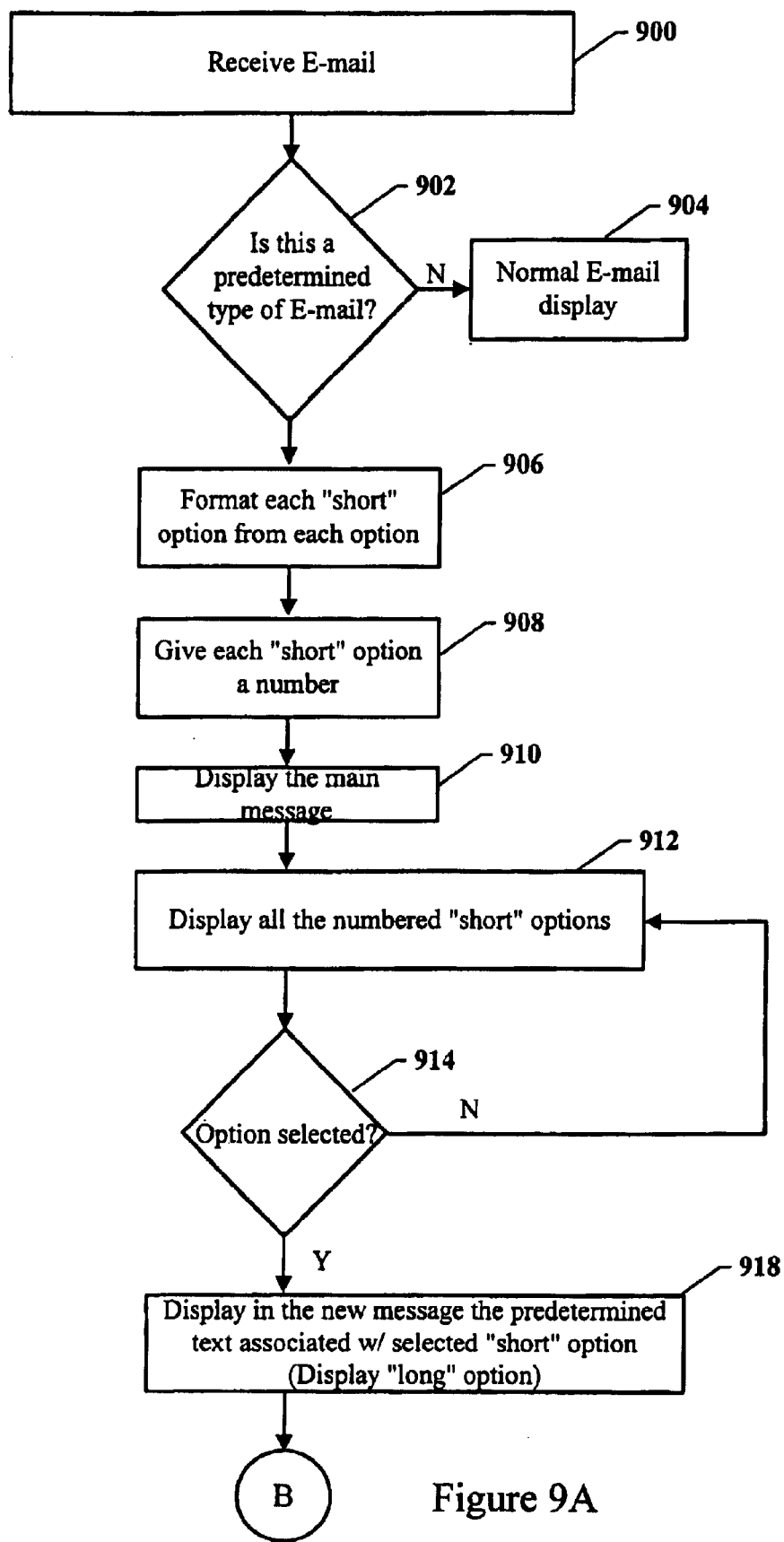
FIGS. 9A–9B are flow diagrams of the method according to an embodiment of the present invention for an e-mail reply system.
Figure 9B:
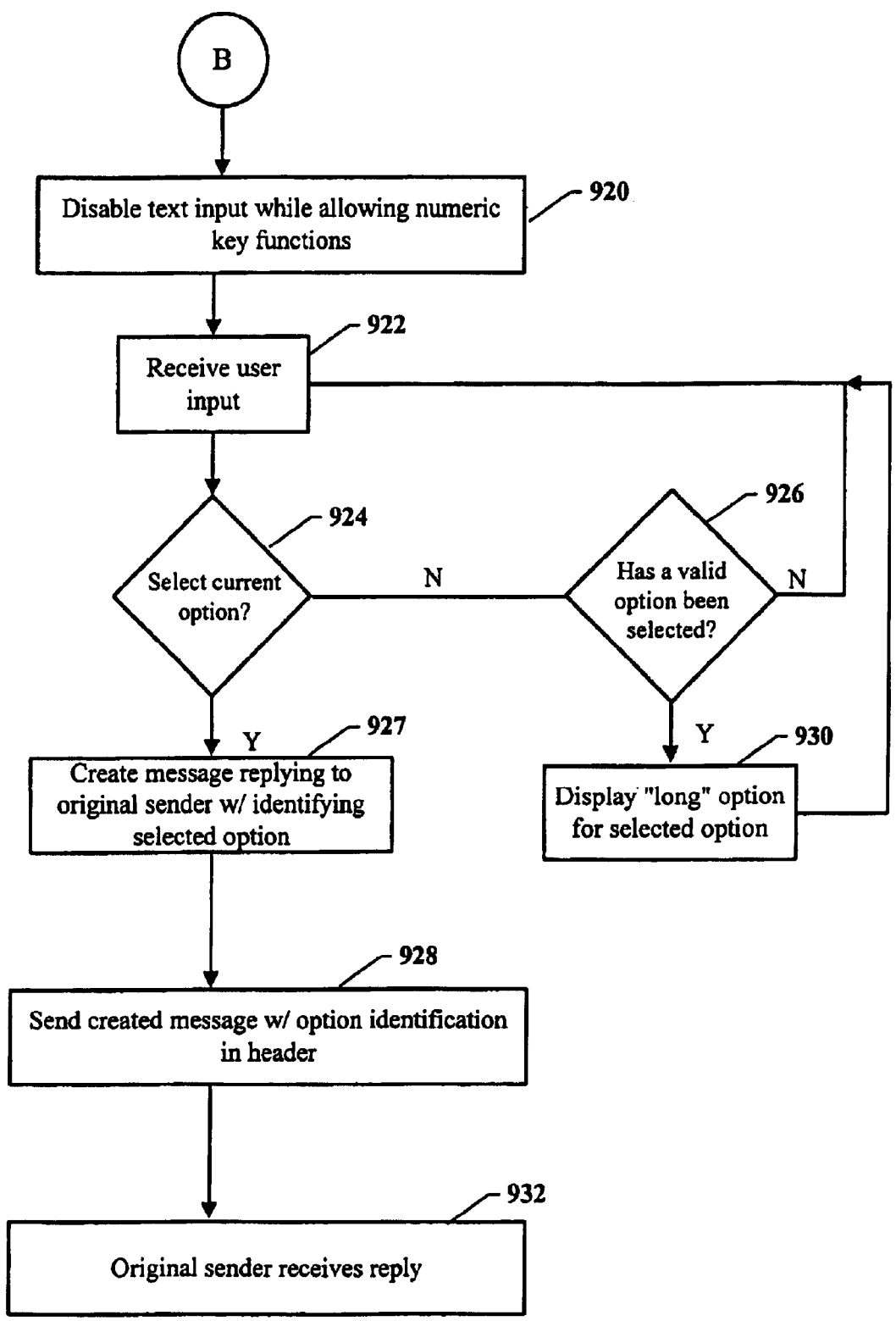

FIGS. 9A–9B are flow diagrams of the method according to an embodiment of the present invention for an electronic message reply system, such as an e-mail reply system. An e-mail is received (step 900), and it is determined whether this e-mail is a predetermined type of e-mail, such as an e-mail of a type named one touch e-mail (step 902). If this e-mail is not the predetermined type of e-mail, then the e-mail is displayed as a normal e-mail (step 904). If, however, this is a predetermined type of e-mail, then each "short" option is formatted (step 906). The short option is formatted for display. For example, the short option may be formatted to be displayed together along with the main e-mail message, as shown in the example of FIG. 8A.

Each short option is then assigned a number (step 908). The main message of the e-mail is then displayed (step 910). All numbered short options are also displayed (step 912). It is then determined whether an option is selected (step 914). If an option is not selected, then the numbered short options are continued to be displayed (step 912). If, however, an option is selected (step 914), then the predetermined text associated short option (display long option) is displayed (step 918).

The text user input may be disabled while allowing numeric key functions to remain enabled (step 920). A user input is then received (step 922). It is then determined whether the current option is selected for sending an order to the original message sender (step 924). The determination of whether to send the current message depends on what user input was received. For example, the current message may be sent if the user presses a send button.

If the current message is not to be sent, then it is determined whether a valid option has been selected (step 926). If a valid option has not been selected, then the system continues to wait to receive another user input. If, however, a valid option has been selected, then the long option associated with the newly selected option is then displayed (step 930).

If the current option is selected to send a message back to the original sender of the message (step 924), then a reply message identifying the selected option is created to be sent back to the original sender (step 927). The created message is sent back to the user with the selected option (step 928). The selected option may be identified in the header of the current message being sent back to the sender so that the sender may identify the selection without having to open up the message. The original sender then receives the reply (step 932).

A method and system for a simple e-mail reply system has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. For example, although the examples herein use e-mail, any electronic message may be used, such as voice, video, text, or any combination thereof. Alternatively, a piece of code may be sent to the receiver. For example, code may be received by the receiving device, interpreted, and produce a message to be presented to the receiver. Examples of such a message include a text message, video message, voice message, or a multimedia message. Accordingly, many modifications may be made by one of ordinary skill in the art without departing from the spirit and scope of the appended claims.

What is claimed is:

1. A-method for responding to an e-mail message comprising:
   receiving an e-mail message created by an original sender;
     determining whether the received e-mail message corresponds to a one-touch e-mail message type, wherein the one-touch e-mail type is created by the original sender according to a first format including:
       a first demarcation which identifies said received e-mail message as a one-touch e-mail message type, wherein the first demarcation indicates one or more options follow the first demarcation; and
     for each of said one or more options;
       a begin short option indicator;
       a long option text; and
       an end short option indictor;
     a second demarcation which indicates an end of said one or more options; and a main message; and
     wherein said determining comprises:
       parsing the received e-mail message prior to displaying the received e-mail message; and detecting whether the received e-mail message types from non-one-touch e-mail messages types;
   processing the received e-mail message in response to determining the received e-mail message corresponds to a one-touch e-mail type, wherein said processing comprises:
     identifying within the received e-mail message a main message and one or more option indicator demarcations, each of said option indicator demarcations corresponding to a selectable option;
     displaying the main message;
     displaying for each of the one or more option indicator demarcations a corresponding first text which is included within the received e-mail message, wherein said first text describes a corresponding option;
     displaying a second text in response to detecting the selection of a first option which corresponds to a first option indictor demarcation of said one or more option indicator demarcations, wherein the second text is included within the received e-mail message and further describes the first option; and
     automatically generating a reply message to the original sender which identifies the first option, in response to input from a user;
   displaying the received e-mail message without performing said processing, in response to determining the e-mail message does not correspond to a one-touch e-mail type.

2. The method of claim 1, wherein the one touch e-mail type is created by the original sender to include a main message and one or more user selectable options, each of the user selectable options including:

a first text which describes a corresponding option; and
a second text which further describes the corresponding option.

3. The method of claim 2, further comprising automatically assigning a number to each of the one or more user selectable options included within the received e-mail message, and wherein each of the one or more user selectable options are displayed along with a number which has been assigned to the corresponding option.

4. The method of claim 1, wherein the e-mail message is received via an interactive television system.

5. The method of claim 4, wherein the at least one option is selected by using a television remote control device.

6. The method of claim 4, wherein subsequent to displaying the received e-mail message according to the first format on a receiving device of a user, the method further comprises disabling text input by the user.

7. The method of claim 6, wherein in response to detecting said first option is selected, the method further comprises displaying a message to the user indicative of a single input from the user which will generate and send a reply message to the sender, said reply message including an identification of the first option and the user.

8. The method of claim 1, wherein the reply message is automatically generated and sent responsive to a single indication received from a user.

9. The method of claim 1, wherein the received e-mail message corresponds to an advertisement for a product or service, and wherein said reply message indicates an interest in the product or service by a user.

10. The method of claim 1, wherein the selected option is identified in a header of the reply message.

11. A system for responding to an electronic message comprising:
   a processor configured to:
      detect a received e-mail message;
      determine whether the receive e-mail corresponds to a one-touch e-mail message type;
      wherein the one-touch e-mail message type is created by the original sender according to a first format, said first format including:
         a first demarcation which identifies said received e-mail message as a one-touch email message type, wherein the first demarcation indicates one or more options follow the first demarcation; and
         for each of said one or more options:
            a begin short option indicator;
            a long option text; and
            an end short option indicator;
         a second demarcation which indicates an end of said one or more options; and a main message; and
      wherein determining whether said received e-mail message corresponds to a one-touch e-mail message type by:
         parsing the received e-mail message prior to displaying the received e-mail message; and
         detecting whether the received e-mail message includes a demarcation which distinguishes one-touch e-mail message types from non-one-touch messages types;
         process-received e-mail message in response to determining said message corresponds to a one-touch e-mail message type, said process comprising:
            identifying within the received e-mail message a main message and one or more option indicator demarcation, each of said one or more option indicator demarcations corresponding to a user selectable option;
            displaying the main message;
            displaying for each of the one or more option indicator demarcations a corresponding first text which is included within the received e-mail message, wherein said first text describes a corresponding option;
            displaying a second text in response to detecting the selection of a first option which corresponds to a first option indicator demarcation of said one or more option indicator demarcations, wherein the second text is included within the received e-mail message and further describes the first option; and
            automatically generating a reply message to the original sender which identifies the first option, in response to input from a user;
         display the received e-mail message without performing said process, in response to determining the e-mail message does not correspond to a one touch e-mail type;
      a memory coupled with the processor, wherein the memory is configured to provide instructions to the processor.

12. A computer program product for responding to an electronic message, said computer program product comprising a computer readable medium wherein the computer readable medium is selected from the group consisting of a CD-ROM, floppy disk, tape, flash memory, system memory, and hard drive; and wherein the computer readable medium including program instructions executable to:
   detect a received e-mail message from an original sender;
   determine whether the received e-mail message corresponds to one-touch e-mail message type, wherein the one-touch e-mail type is created by the original sender according to a first format, said first format including:
      a first demarcation which identifies said received e-mail message as a one-touch e-mail message type, wherein the first demarcation indicates one or more options follow the first demarcation; and
      for each of said one or more options:
         a begin short option indicator;
         a long option text; and
         an end short option indicator;
      a second demarcation which indicates an end of said one or more options, and a main message; and
   wherein said determining further comprises:
      parse the received e-mail message prior to displaying the received e-mail message; and
      detect whether the received e-mail message includes a demarcation which distinguishes one-touch e-mail message types from non-one touch e-mail message types;
   process the receive e-mail message, in response to determining the received e-mail message corresponds to a on-touch e-mail type, wherein said process comprises:
      identifying within the received e-mail message a main message and one or more option indicator demarcations, each of said option indicator demarcations corresponding to a user selectable option;
      displaying the main message;
      displaying for each of the one or more option indicator demarcations a corresponding first text which is included within the received e-mail message, wherein said first text describes a corresponding option;
      display a second text in response to detecting a selection of a first option which corresponds to a first option indicator demarcation of said one or more option indicator demarcations, wherein the second text is included within the received e-mail message and further describes the first option; and automatically generate a reply message to the original sender which identifies the first option, in response to input from a user;

display the received e-mail message without performing said process, in response to determining the e-mail message does not correspond to a one-touch e-mail type.

* * * * *

UNITED STATES PATENT AND TRADEMARK OFFICE
CERTIFICATE OF CORRECTION

PATENT NO. : 6,915,332 B1 Page 1 of 1
DATED : July 5, 2005
INVENTOR(S) : Joel Zdepski It is certified that error appears in the above-identified patent and that said Letters Patent is hereby corrected as shown below:

<u>Column 8,</u>
Line 13, after "A" delete "-".
Lines 29 and 53, delete "indictor" and insert -- indicator --, therefor.

<u>Column 9,</u>
Line 60, delete "process-received" and insert -- process_received --, therefor.

<u>Column 10,</u>
Line 18, delete "one touch" and insert -- one-touch --, therefor.
Line 44, after "options" delete "," and insert -- ; --, therefor.
Lines 50 and 55, delete "non-one touch" and insert -- non-one-touch --, therefor.
Line 53, delete "receive" and insert -- received --, therefor.

Signed and Sealed this

Eleventh Day of October, 2005

JON W. DUDAS
*Director of the United States Patent and Trademark Office*